US012763904B2

(12) United States Patent
Goldstein et al.

(10) Patent No.: US 12,763,904 B2
(45) Date of Patent: Oct. 13, 2026

(54) RADIO ACCESS NETWORK SPLITS FOR REDUCED RADIO UNIT COMPLEXITY

(71) Applicant: Dell Products L.P., Round Rock, TX (US)

(72) Inventors: Eran Goldstein, Montreal (CA); Ilya Portnik, Ashton (CA); Mohammed Abdelsadek, Kanata (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 347 days.

(21) Appl. No.: 18/413,256

(22) Filed: Jan. 16, 2024

(65) Prior Publication Data

US 2025/0233708 A1 Jul. 17, 2025

(51) Int. Cl.
*H04L 5/00* (2006.01)
*H04B 7/024* (2017.01)
(Continued)

(52) U.S. Cl.
CPC ........... *H04L 5/0051* (2013.01); *H04B 7/024* (2013.01); *H04B 7/0617* (2013.01);
(Continued)

(58) Field of Classification Search
CPC ... H04L 5/0032; H04L 5/0035; H04L 5/0048; H04L 5/0051; H04B 7/0452; H04B 7/0456; H04W 72/044; H04W 72/046
See application file for complete search history.

(56) References Cited

U.S. PATENT DOCUMENTS

2022/0021423 A1* 1/2022 Ahmed ................. H04W 72/21
2023/0155864 A1* 5/2023 Abdoli ................ H04L 25/0204
370/329

(Continued)

OTHER PUBLICATIONS

Perez-Romero et al., "A Tutorial on the Characterisation and Modelling of Low Layer Functional Splits for Flexible Radio Access Networks in 5G and Beyond", Jul. 19, 2023, IEEE Communications Surveys & Tutorials (vol. 25, Issue: 4, Fourth quarter 2023), pp. 2791-2833, DOI: 10.1109/COMST.2023.3 (Year: 2023).*

*Primary Examiner* — Paul H. Masur
(74) *Attorney, Agent, or Firm* — Amin, Turocy & Watson, LLP

(57) ABSTRACT

The technology described herein is directed towards radio unit and distributed unit splits, including for massive MIMO systems and/or O-RAN splits. Demodulation reference signal (DMRS)-based receive beamforming is split between a radio unit and a distributed unit, in which the computational resources needed for channel estimation, DMRS weight calculation and equalization are located in the distributed unit rather than the radio unit. In one implementation, the radio unit extracts the DMRS symbols and resource elements (REs) and sends them with little or no beamforming to the distributed unit; channel estimation and beamforming coefficients are computed at the distributed unit based on the DMRS data, and returned to the radio unit for use in receive beamforming for the current slot or a future slot. The radio unit can send candidate beams to the distributed unit for combining to reduce any non-optimality of the beams. A future optimal beam can be predicted.

20 Claims, 11 Drawing Sheets

(51) Int. Cl.
*H04B 7/06* (2006.01)
*H04W 72/044* (2023.01)
*H04W 88/08* (2009.01)

(52) U.S. Cl.
CPC ......... *H04L 5/0035* (2013.01); *H04W 72/046* (2013.01); *H04W 88/085* (2013.01)

(56) References Cited

U.S. PATENT DOCUMENTS

| | | | | |
|---|---|---|---|---|
| 2023/0344483 | A1* | 10/2023 | Akoum | H04L 25/0224 |
| 2023/0344680 | A1* | 10/2023 | Akoum | H04B 7/0619 |
| 2024/0204840 | A1* | 6/2024 | Akoum | H04L 5/0051 |
| 2024/0348398 | A1* | 10/2024 | Yang | H04L 5/0051 |
| 2025/0031067 | A1* | 1/2025 | Demir | H04L 25/0228 |
| 2025/0202553 | A1* | 6/2025 | Chivate | H04L 5/0051 |

* cited by examiner

RADIO ACCESS NETWORK SPLITS FOR REDUCED RADIO UNIT COMPLEXITY

BACKGROUND

A general motivation behind open radio access network (O-RAN) is to help service providers avoid being locked into one vendor, while encouraging vendor diversity. With O-RAN, service providers that deploy radio access networks are not limited to single-vendor solutions with respect to equipment and software.

In open radio access network (O-RAN) standards, a fronthaul interface connects the open radio unit (O-RU) and the open distributed unit (O-DU). To reduce the uplink (UL) fronthaul throughput, receive beamforming is implemented in the radio unit. However, in the current O-RAN split 7.2, the beamforming coefficients are calculated in the distributed unit, utilizing the sounding reference signal (SRS) transmitted by the user equipment (UE) and communicated to the radio unit through the fronthaul control plane (C-plane).

Because the transmission of the SRS reduces the radio resources available for uplink data, SRS is scheduled with a periodicity of several milliseconds for each UE. This impacts the SRS-based calculation of the beamforming coefficients due to changing channel conditions, particularly in high mobility scenarios; that is, the SRS-based beamforming coefficients are out of date with respect to current conditions. This results in reduced uplink throughput, and adversely impacts the overall system performance.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
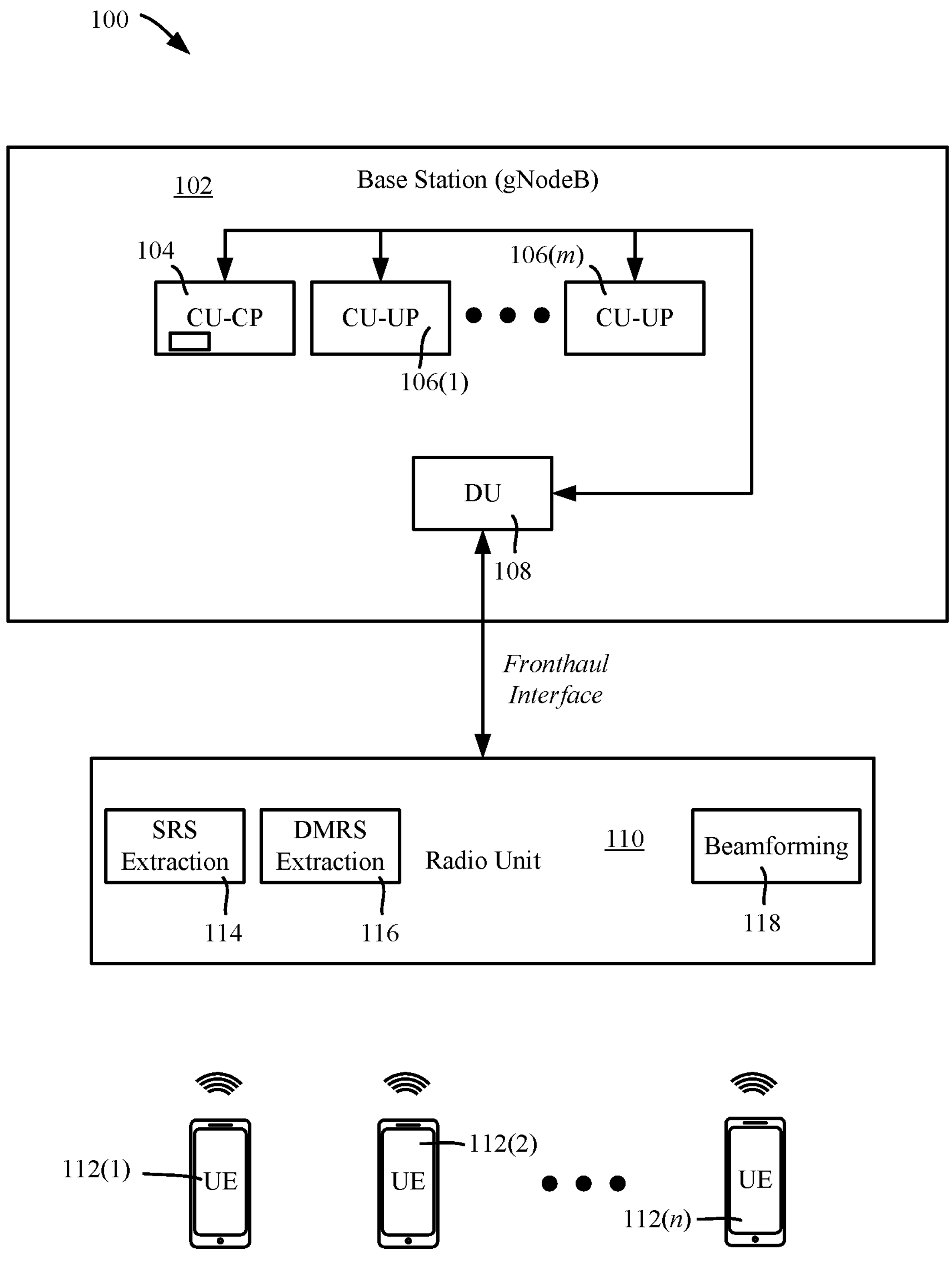
FIG. 1 is an example block diagram representation of a system/architecture for demodulation reference signal-based receive beamforming, in accordance with various example embodiments and implementations of the subject disclosure.

Various example embodiments of the technology described herein are generally directed towards using demodulation reference signal (DMRS) data to determine the weight data (coefficients) used for beamforming, in which the weight data are determined in the distributed unit. The DMRS data are more up to date relative to the periodic sounding reference signal (SRS) data, thereby facilitating better beamforming in general relative to SRS-based coefficients determination, including during changing channel conditions.

In one implementation, the DMRS data are sent by the radio unit to the distributed unit without beamforming, or with little beamforming. The beamforming coefficients are computed at the distributed unit based on the DMRS data and sent back to the radio unit. The radio unit uses the returned coefficients to beamform the received uplink transmission data. Note that based on the 3GPP (Third Generation Partnership Project) standards, DMRS are already sent with every physical uplink shared channel (PUSCH) communication, therefore there is no reduction of available resources (as with using SRS data for receive beamforming). Other implementations are described herein, which can be combined with each other.

Reference throughout this specification to “one embodiment,” “an embodiment,” “one implementation,” “an implementation,” etc. means that a particular feature, structure, or characteristic described in connection with the embodiment/implementation is included in at least one embodiment/implementation. Thus, the appearances of such a phrase “in one embodiment,” “in an implementation,” etc. in various places throughout this specification are not necessarily all referring to the same embodiment/implementation. Furthermore, the particular features, structures, or characteristics may be combined in any suitable manner in one or more embodiments/implementations. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can mean the highest performing entity of what is available (e.g., the top-rated beam of some limited set of available beams), rather than necessarily achieving a fully optimal result. Similarly, "maximize" means moving towards a maximal state (e.g., up to some threshold limit, if any), rather than necessarily achieving such a state.

Example embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is a block diagram representation of an example system/architecture 100 including a base station 102 (alternatively referred to as a gNodeB herein for existing advanced networks, but adaptable to future advanced networks). The example base station 102 includes a centralized unit control plane (CU-CP) component 104, one or more centralized unit user plane (CU-UP) components 106(1)-106(*m*), and a distributed unit 108.

The distributed unit 108 is coupled to a radio unit 110, which in open radio access network (O-RAN) is via a fronthaul interface. In this example, the radio unit 110 couples user equipment (UEs) 112(1)-112(*n*) to the base station 102 to provide wireless communication service to the 112(1)-112(*n*). As will be understood, the radio unit includes various components, including for sounding reference signal (SRS) extraction 114, demodulation reference signal (DMRS) extraction 116 and beamforming 118. Additional details of these components are described with reference to FIGS. 2-4.

In general, base stations with many antenna systems (e.g., on the order of 64/massive multiple input, multiple output or MIMO) need a high throughput to communicate between the O-RU and O-DU over the fronthaul interface on the uplink side. One well-known existing O-RAN split includes receive beamforming of the uplink channels, in which the beamforming coefficients calculation is based on non-beamformed SRS channel estimation. The reduction of the fronthaul interface throughput achieved by receive beamforming depends on the number of spatial layers that the O-DU has to decode, and can be calculated as follows:

$$K = \frac{Throughpout_{before\ beamforming}}{Throughpout_{after\ beamforming}} = \frac{\text{number of antennas}}{\text{number of layers}}$$

As can be seen from the above, the benefit of beamforming is diminished when the number of layers (that is, beams) that are transferred to the distributed unit increases. The tradeoff in the existing O-RAN split is that increasing the periodicity of the SRS channel reduces the number of radio resources available for the uplink data, which reduces the uplink throughput of the UE, whereas reducing the SRS periodicity results in less up-to-date beams, which reduces uplink performance (and also reduces the UE's uplink throughput). Described herein is a different split design that uses demodulation reference signal (DMRS) data for determining the beam weights/coefficients data, which is more up to date than SRS data. Note however that the SRS data, which is still useful, can also be used in the calculations.

Figure 2:
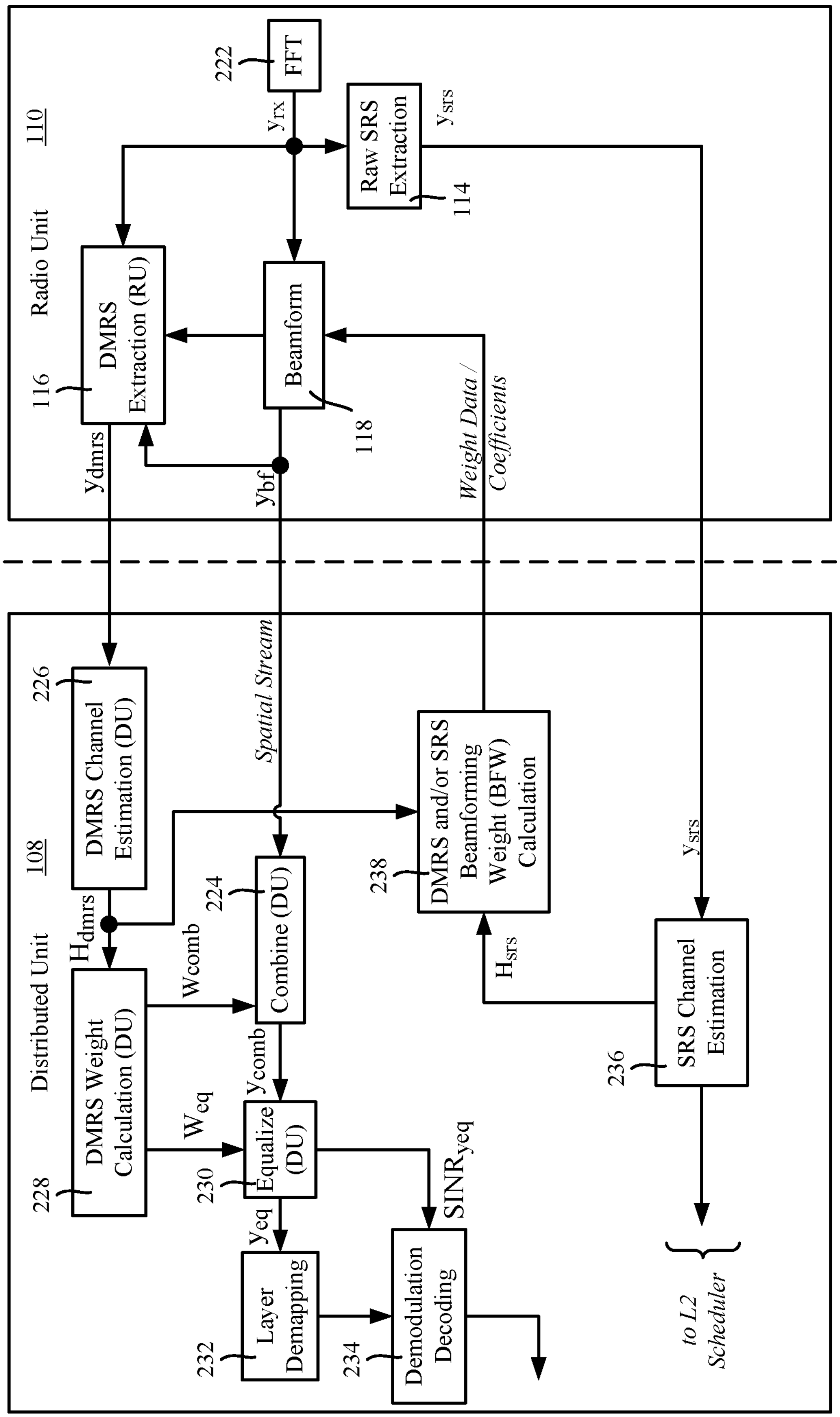
FIG. 2 shows an example block diagram representation of a split between a distributed unit and a radio unit to accomplish demodulation reference signal-based receive beamforming, in accordance with various example embodiments and implementations of the subject disclosure.

FIG. 2 shows one example embodiment of an O-RAN split between a distributed unit 108 and a radio unit 110, in which demodulation reference signal (DMRS) data is used for (at least part of) the beamforming weight data (beamforming coefficients) calculation. Significantly, in the example embodiment of FIG. 2, the radio unit 110 performs relatively limited computations compared to the distributed unit 108; (note that this is in contrast to other O-RAN split designs that significantly increase the complexity of the radio unit, which makes the radio unit more expensive and consumes more power for the additional processing, which in turn requires more cooling). In addition to being inefficient to implement the calculation of the beamforming coefficients in the radio unit, it is more difficult to keep the radio unit updated compared to the distributed unit; that is, in general it is better to keep algorithms that can change, such as optimal beamforming coefficients calculations, at the distributed unit.

In FIG. 2, the labeled arrows with y refer to received/processed symbols, H refer to estimated channel data, and W refer to weight data. More particularly, the following arrow label representations and their meanings are shown in FIG. 2:

$y_{rx}$: main received symbols after the FFT block
$y_{bf}$: symbols after applying receive beamforming
$y_{srs}$: extracted SRS symbols (from $y_{rx}$ before the receive beamforming)
$y_{dmrs}$: extracted DMRS symbols
$y_{eq}$: equalized symbols (after applying equalization)
$y_{comb}$: combined symbols from the spatial stream
$H_{dmrs}$: estimated channel based on DMRS
$H_{srs}$: estimated channel based on SRS
$W_{srs}$: beamforming weights calculated using SRS
$W_{dmrs}$: beamforming weights calculated using DMRS
$W_{eq}$: equalizer weights calculated using DMRS
$W_{comb}$: combined weights.

As shown in FIG. 2, the radio unit 110 includes a fast Fourier transform block 222, which outputs the $y_{rx}$ symbols to a DMRS extraction component 116, the beamform component 118 and a raw SRS extraction component 114. Note that it is feasible for DMRS extraction to be performed at the distributed unit 108, however such extraction processing is relatively straightforward and does not result in a lot of fronthaul data needing to be sent to the distributed unit.

In FIG. 2, the depicted distributed unit 108 also includes components for DMRS channel estimation (block 226), DMRS weight calculation (block 228), equalize (block 230), layer demapping (block 232) and demodulation decoding (block 234). In general, these components of the distributed unit 108 are well known, such as described as part of the uplink O-RAN Split 7.2 specifications, and thus are not described in detail herein. What is different in FIG. 2 relative to the existing uplink O-RAN Split 7.2 is that the beamforming weights calculated at block 238 based on DMRS ($H_{dmrs}$) and/or SRS ($H_{srs}$, block 236) are returned in a round-trip operation to the beamform component 118, which uses those weights to beamform a spatial stream $y_{bf}$ (the symbols after applying receive beamforming) to a combine component 224 of the distributed unit 108. The use of receive beamforming based on SRS-determined coefficients is known, e.g., to combine and send a single beamformed spatial stream/layer for 64 antennas and thus reduce fronthaul throughput (e.g., a 64 times reduction). To reiterate, however, the determined coefficients can be outdated as a result of the infrequent SRS-based received data, and thus far from optimal.

Notwithstanding, in the example implementation of FIG. 2, SRS-based beamforming weights also can be used in determining the beamforming by the radio unit 110. Indeed, the distributed unit 108 has two sources of information (DMRS and SRS) to decide the beam coefficients. This is represented by the SRS extraction component 114 extracting SRS symbols $y_{srs}$ (from $y_{rx}$ before the receive beamforming) and communicating those $y_{srs}$ symbols to an SRS channel estimation component 236 at the distributed unit 108. The distributed unit 108 can obtain the estimated channel data ($H_{srs}$) based on SRS and send it to a DMRS and/or SRS beamforming weight (BFW) calculation component 238.

Therefore, as shown via block 238 which receives both DMRS-based and SRS-based inputs, the distributed unit 108 can use both inputs to create more optimal beamforming coefficients. The DMRS and/or SRS beamforming weight (BFW) calculation component 238 calculates the coefficients, and can send those coefficients to the radio unit 110 at different intervals, irrespective of the DMRS or SRS intervals (as it also can to predict the beam coefficients as described with reference to FIG. 4). Note however that both inputs are not needed at every given moment by the DMRS and/or SRS beamforming weight (BFW) calculation component 238.

Thus, with the technology described herein as implemented in the round-trip design of FIG. 2, the DMRS extraction component 116 (of the radio unit 110) extracts the DMRS symbols and resource elements (REs) and sends them with little or no beamforming to the distributed unit 108. In typical use cases, the number of DMRS symbols and REs is considerably lower than the data, and therefore the increase in fronthaul interface throughput is small. With the extracted DMRS data ($y_{dmrs}$) and/or SRS data ($y_{srs}$), channel estimation and beamforming coefficients are computed at the distributed unit 108 side (blocks 226 and 228, respectively) based on the up-to-date DMRS received from the radio unit 110 as well as SRS-based data as appropriate. Via the DMRS and/or SRS beamforming weight (BFW) calculation component 238, the distributed unit 108 sends to the radio unit 110 the updated beamforming weight data (e.g., coefficients) either to be used for beamforming PUSCH data in the current slot (which thus will result in some increased latency because of waiting for the coefficients to be returned in real time), or to be used in future slots (and thus does not increase the latency). Some additional memory at the radio unit may be needed as well.

The option to send non-beamformed DMRS can be dynamic, in that it can be used in some and not all of the slots, to further reduce the fronthaul throughput and calculations on the distributed unit 108 side, such as in cases where the channel does not change considerably. One way this can be achieved is by adding a bitfield in the fronthaul C-Plane message to the radio unit 110, in which the message indicates which DMRS are to be sent non-beamformed. If the returned (e.g., highly optimal, DMRS-based) beamforming coefficients are not to be used in the current slots, the radio unit 110 can send both beamformed DMRS (first to reduce latency by starting the decoding process) and later non-beamformed DMRS to be processed for beamforming.

Note that "little" or "partial beamforming does not use all the antennas. Normally beamforming combines the signal of all antennas with different coefficients, which creates a narrow beam:

$$y = \sum_{i=1}^{i=N} y_i * c_i$$

where y is the beamformed signal, and $y_i$ is the signal at antenna index i. and $c_i$ is the coefficient for antenna i.

In contrast, "little beamforming" refers to the DMRS that are beamformed without using all of the antennas to create a wider beam:

$$y = \sum_{i} y_i * c_i$$

where i ∈ a set of selected antennas. For example, if half the antennas (n/2) form a subgroup to be used in beamforming:

$$y = \sum_{i=1}^{i=\frac{N}{2}} y_{2*i} * c_{2*i}.$$

Such little/partial beamforming can be combined with the radio unit sending multiple beams (as described with reference to FIG. 3) to provide the distributed unit with more information while not overly increasing the throughput over the fronthaul interface.

Figure 3:
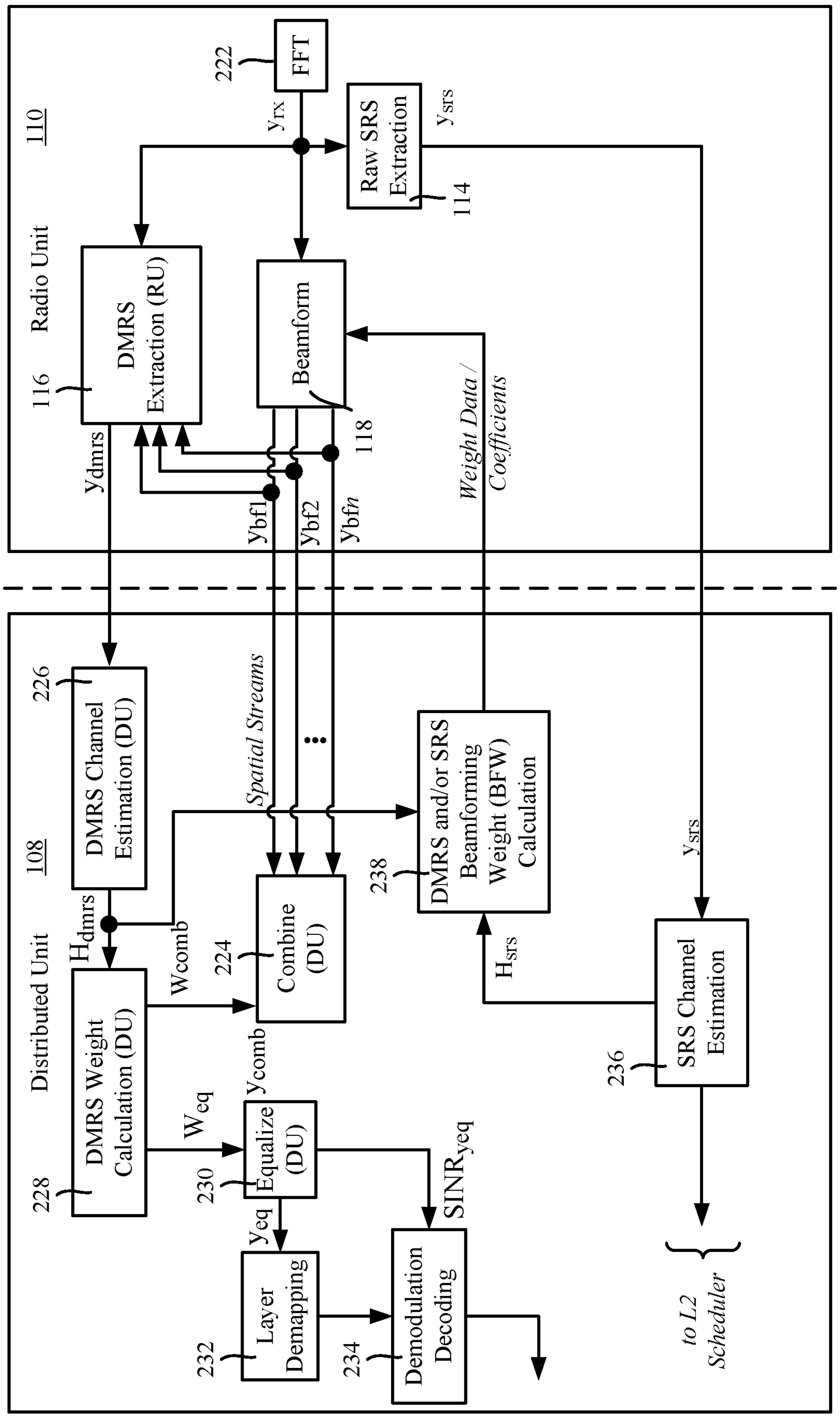
FIG. 3 shows an example block diagram representation of a split between a distributed unit and a radio unit to accomplish demodulation reference signal-based receive beamforming using multiple candidate beams, in accordance with various example embodiments and implementations of the subject disclosure.

FIG. 3 shows another implementation, referred to as a beam candidates option. In this approach, several beams/spatial streams ($y_{bf1}$-$y_{bfn}$) are sent to the distributed unit 108 instead of a spatial stream based on one receive beamforming coefficients set. In this way, the distributed unit 108 can combine the beams to obtain a more optimal signal. more particularly, because the beam coefficients are not up to date, the O-RU sends more beams to the distributed unit 108, and the distributed unit's equalizer 230 combines that extra data to reduce the impact of the non-optimality of the beams. The more beams that are sent, the higher the performance of the uplink channel decoding; however, as a tradeoff, the higher the fronthaul throughput. As described herein, the beam candidates implementation can work simultaneously with the round trip implementation as an option to reduce DMRS throughput (e.g., based on slightly beamformed DMRS as described above).

Figure 4:
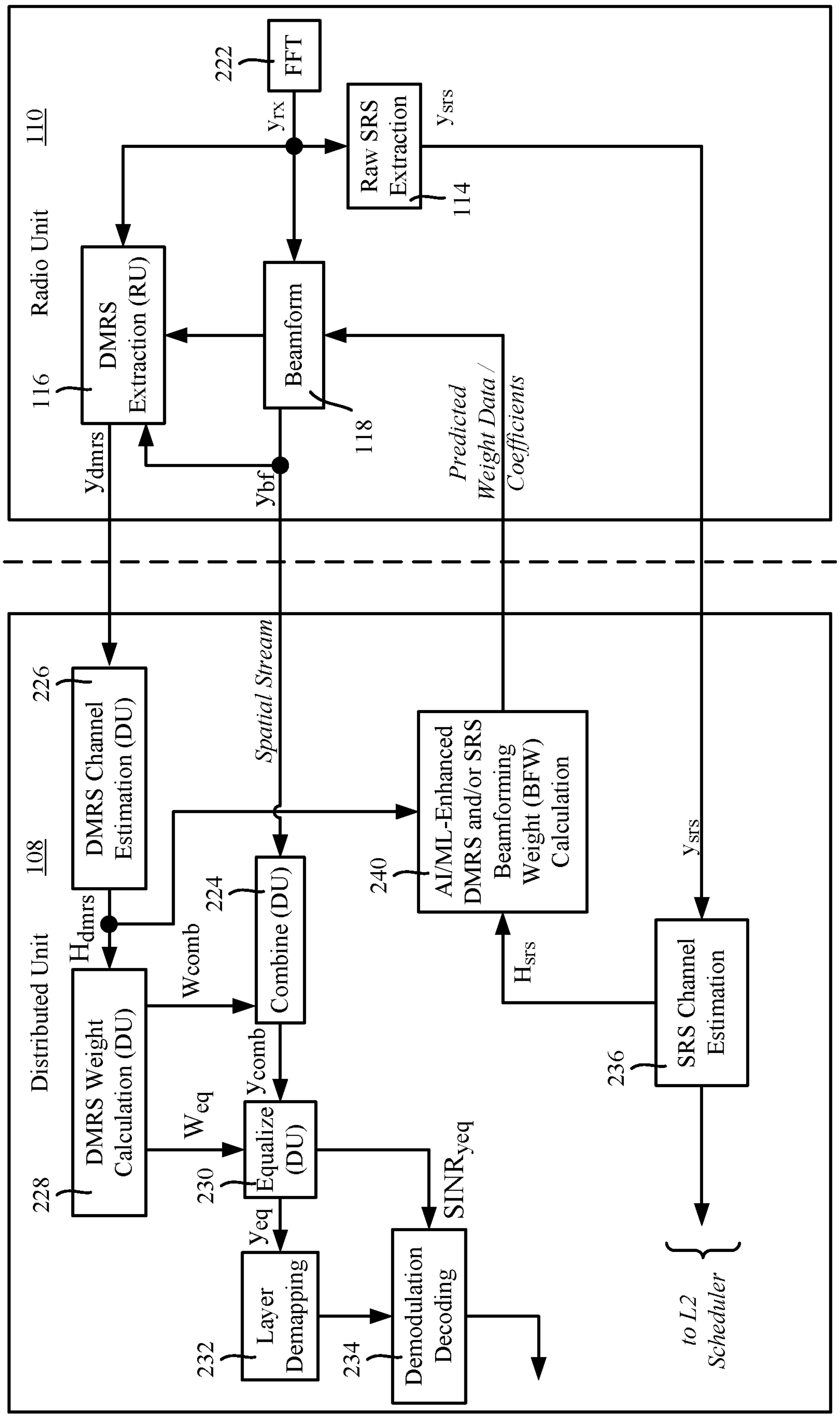
FIG. 4 shows an example block diagram representation of a split between a distributed unit and a radio unit to accomplish demodulation reference signal-based receive beamforming based on predicted beamforming weight data, in accordance with various example embodiments and implementations of the subject disclosure.

FIG. 4 shows another implementation, referred to as a beam predictions option. In this approach, the distributed unit 108 utilizes artificial intelligence (AI)/machine learning (ML) techniques (block 240) to predict a future optimal beam, e.g., based on trajectory of a UE. This improves the selected beam, even when the last channel perceived is not up-to-date. Any suitable AI architecture (e.g., convolutional layers, LSTM layers, batch normalization layers, decision tree) or training paradigm (e.g., supervised, unsupervised, reinforcement) can be used, in which the type of input data (e.g., the DMRS data over time) or the type of output data (e.g., the beamforming coefficients) can be learned and later used in inference.

Figure 5:
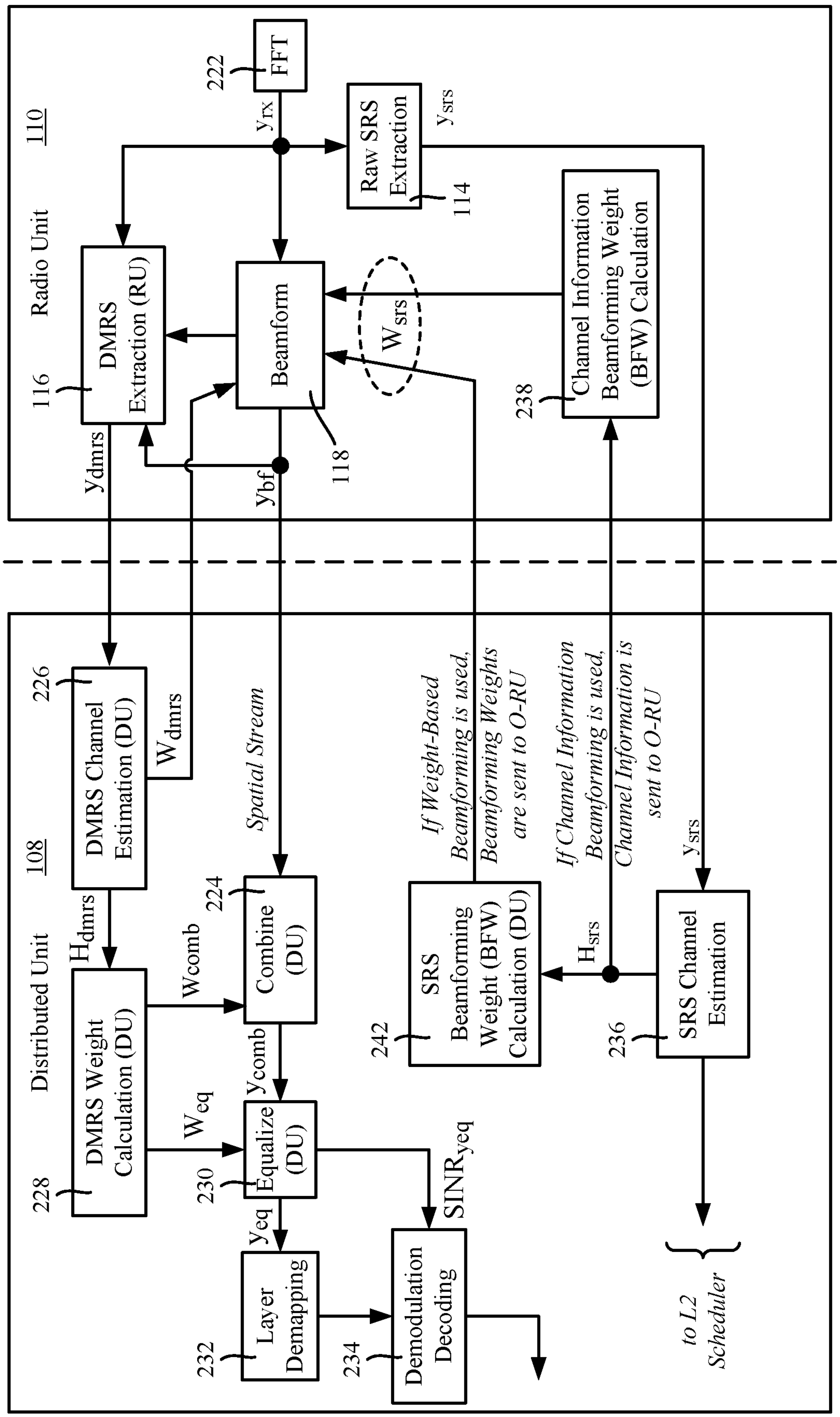
FIG. 5 shows an example block diagram representation of an alternative split between distributed unit and radio units to accomplish demodulation reference signal-based receive beamforming, in accordance with various example embodiments and implementations of the subject disclosure.

Not all of the weight computation need be done at the distributed unit 108 side. For example, FIG. 5 shows another implementation in which the beamform component 118 at the radio unit 110 obtains the weight data $W_{dmrs}$ and $W_{srs}$ from the distributed unit 108 via DU components 226 and 242 respectively, and uses these weight data to beamform. In this alternative, the distributed unit 108 can perform the beamforming weight (BFW) calculation (block 242) and return the beamforming weight data $W_{srs}$ for use by the beamform component 118 of the radio unit 108.

Alternatively, the distributed unit 108 can return the estimated channel data based on SRS ($H_{srs}$) to a channel information beamforming weight (BFW) calculation component 238 of the radio unit 110, which processes the channel information into SRS-based beamforming weight data $W_{srs}$ for use by the beamform component 118 of the radio unit 108. In other words, in the alternative implementation of FIG. 5, if SRS-based channel information beamforming is used, channel information is sent to the radio unit 108, whereas if SRS-based weight-based beamforming is used, beamforming weights are sent to the radio unit 108. It should be noted that the alternative implementation of FIG. 5 can be adapted to support multiple spatial streams (as in FIG. 3) and/or to use AI/ML to obtain weight data predictions as in FIG. 4.

Further, note that the implementations of FIGS. 2-5 can be implemented to dynamically adapt to different operational scenarios. In any event, whether performed at the distributed unit side, the radio unit side, or a combination of both, the technology described herein can have DMRS-based coefficient determination work simultaneously with the existing SRS-based coefficient determination method, by combining the data from both resources according to their quality and their relevance.

Figure 6A:
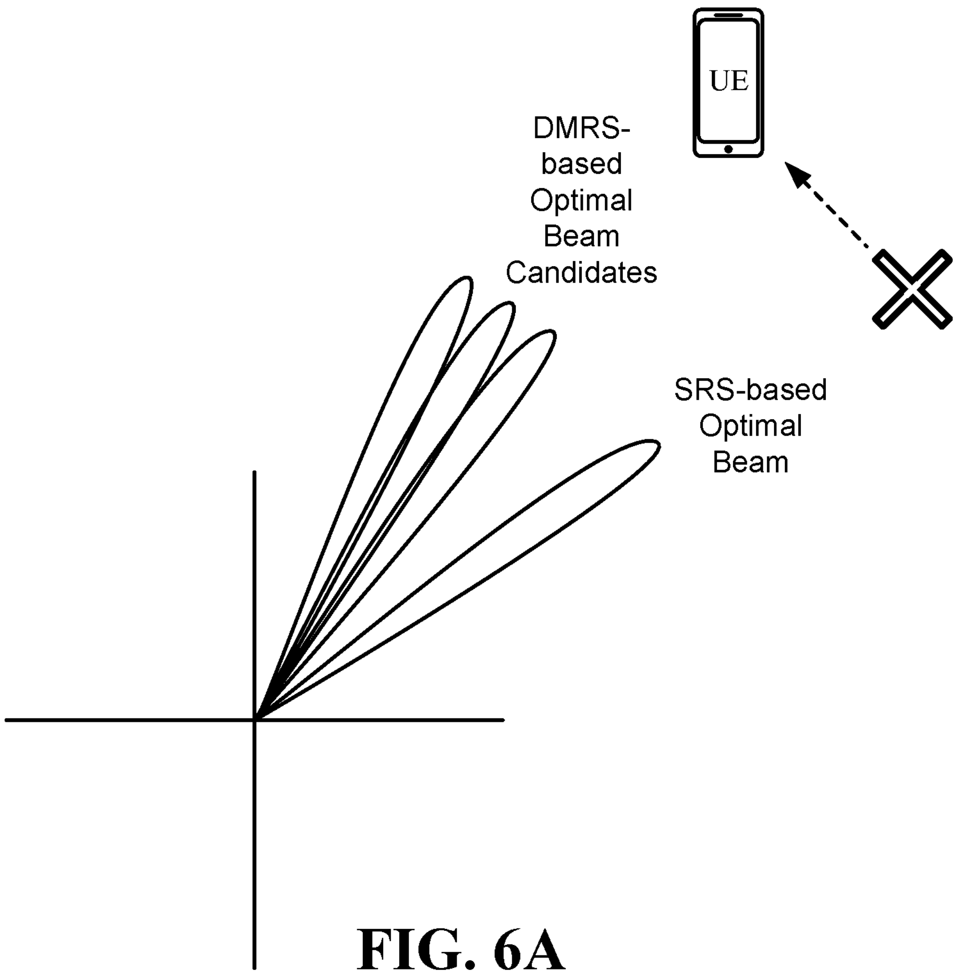
FIG. 6A is an example representation of candidate beams based on demodulation reference signal-based receive beamforming versus sounding reference signal-based receive beamforming, in accordance with various example embodiments and implementations of the subject disclosure.
Figure 6B:
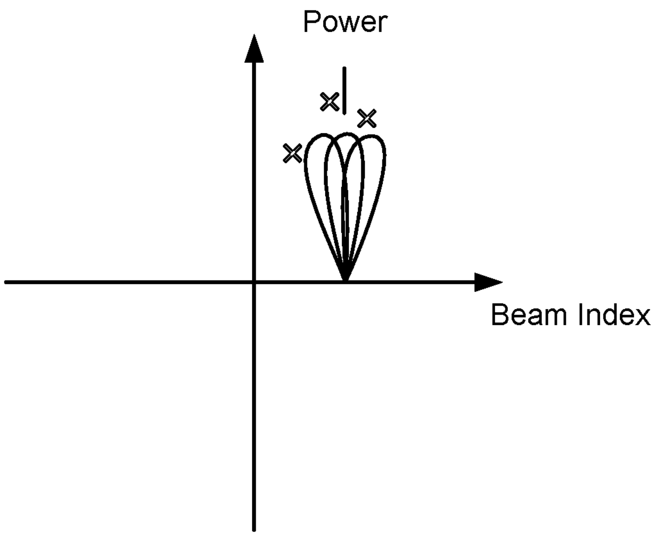
FIG. 6B is an example representation of demodulation reference signal-based candidate beams based on measured power, in accordance with various example embodiments and implementations of the subject disclosure.

FIG. 6A shows the concept of example candidate beamforms versus the SRS-based beamform. As can be seen, if the UE moves, the SRS-beam is not particularly optimal, whereas the DMRS candidate beams are more optimal. As shown in FIG. 6B, example power measurements (the crosses for three beams) show that the highest power is likely (at the vertical line) between the second beam index and the third beam index. Accordingly, a beam's coefficients can be determined for the highest power location, along with coefficients for other candidate beams close to the highest power location.

Figure 7:
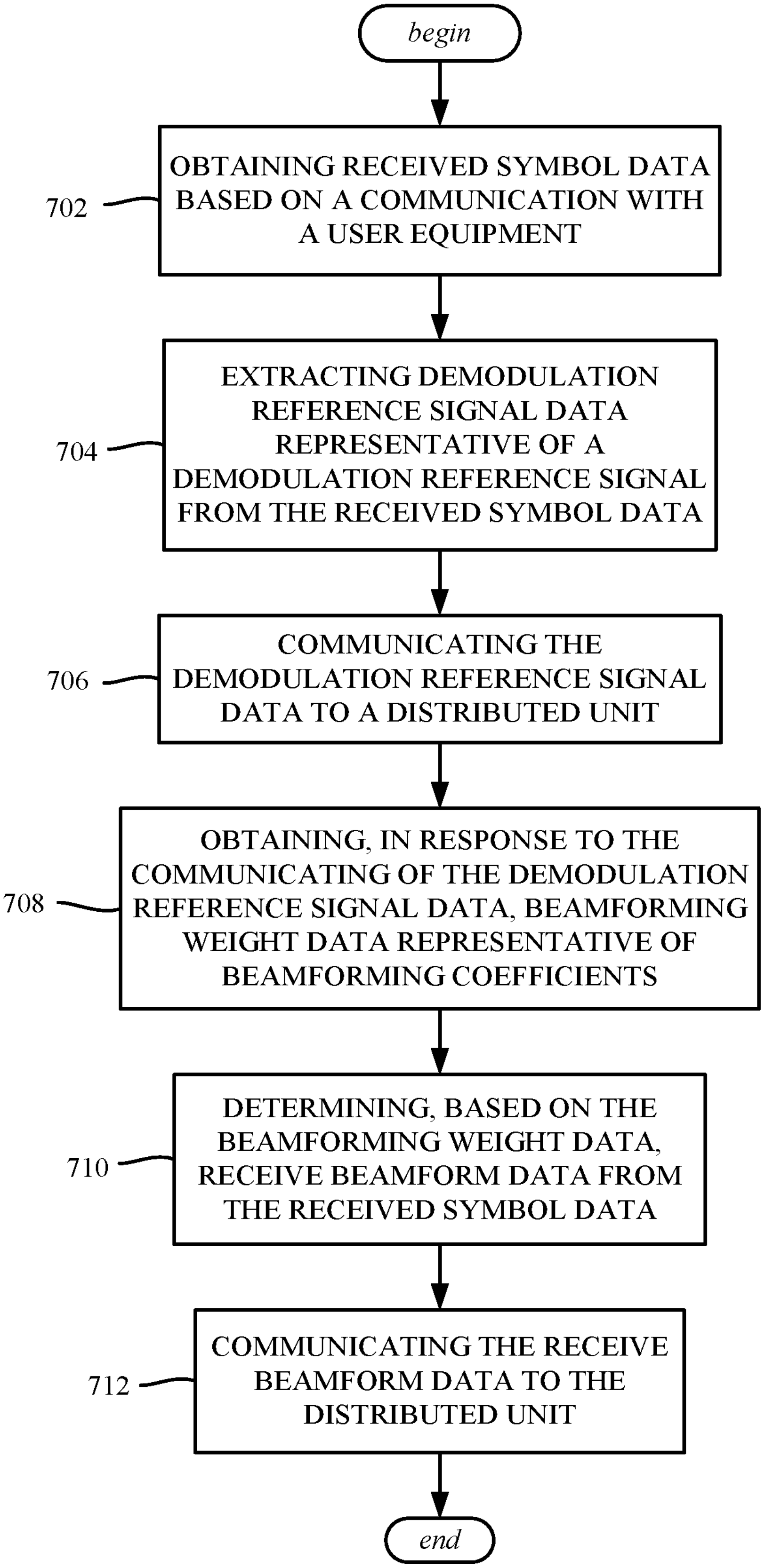
FIG. 7 is a flow diagram showing example operations related to obtaining beamforming weight data based on demodulation reference signal data, in accordance with various example embodiments and implementations of the subject disclosure.

One or more example embodiments can be embodied in network equipment, such as represented in the example operations of FIG. 7, and for example can include a memory that stores computer executable components and/or operations, and a processor that executes computer executable components and/or operations stored in the memory. Example operations can include operation 702, which represents obtaining received symbol data based on a communication with a user equipment. Example operation 704 represents extracting demodulation reference signal data representative of a demodulation reference signal from the received symbol data. Example operation 706 represents communicating the demodulation reference signal data to a distributed unit. Example operation 708 represents obtaining, in response to the communicating of the demodulation reference signal data, beamforming weight data representative of beamforming coefficients. Example operation 710 represents determining, based on the beamforming weight data, receive beamform data from the received symbol data. Example operation 712 represents communicating the receive beamform data to the distributed unit.

The beamforming weight data can be for a current slot, and determining the receive beamform data can include beamforming the received symbol data based on the beamforming weight data for the communication with the user equipment.

The received symbol data can include first received symbol data based on a first communication with the user equipment, the beamforming weight data can be for a future slot, and further operations can include obtaining second received symbol data based on a second communication with the user equipment, and beamforming the second received symbol data based on the beamforming weight data; communicating the receive beamform data to the distributed unit can include communicating the second receive beamform data to the distributed unit.

Obtaining the received symbol data can be performed by a radio unit of the network equipment, and the radio unit can apply at least a fast Fourier transform function that outputs the received symbol data for the extracting of the demodulation reference signal data, and for the determining of the receive beamform data.

The beamforming weight data can include first beamforming weight data, and further operations can include extracting sounding refence signal data from the received symbol data, communicating the sounding refence signal data to the distributed unit, obtaining, in response to the communicating of the sounding refence signal data, second beamforming weight data based on the sounding refence signal data, and using the first beamforming weight data in conjunction with the second beamforming weight data as the beamforming weight data for the second communication with the user equipment. The second beamforming weight data can be determined by the distributed unit. Obtaining the second beamforming weight data can include obtaining channel information from the distributed unit, and processing the channel information into the second beamforming weight data.

Communicating the receive beamform data to the distributed unit can include sending one or more spatial streams as beam candidate data to the distributed unit.

The beamforming weight data can include predicted beamforming weight data for the second communication with the user equipment.

Further operations can include obtaining message data from the distributed unit that indicates which demodulation reference signal data is to be communicated as non-beamformed demodulation reference signal data, and communicating the demodulation reference signal data can include communicating at least some of the demodulation reference signal data to the distributed unit as beamformed demodulation reference signal data, and communicating at least some of the demodulation reference signal data to the distributed unit as the non-beamformed demodulation reference signal data.

Figure 8:
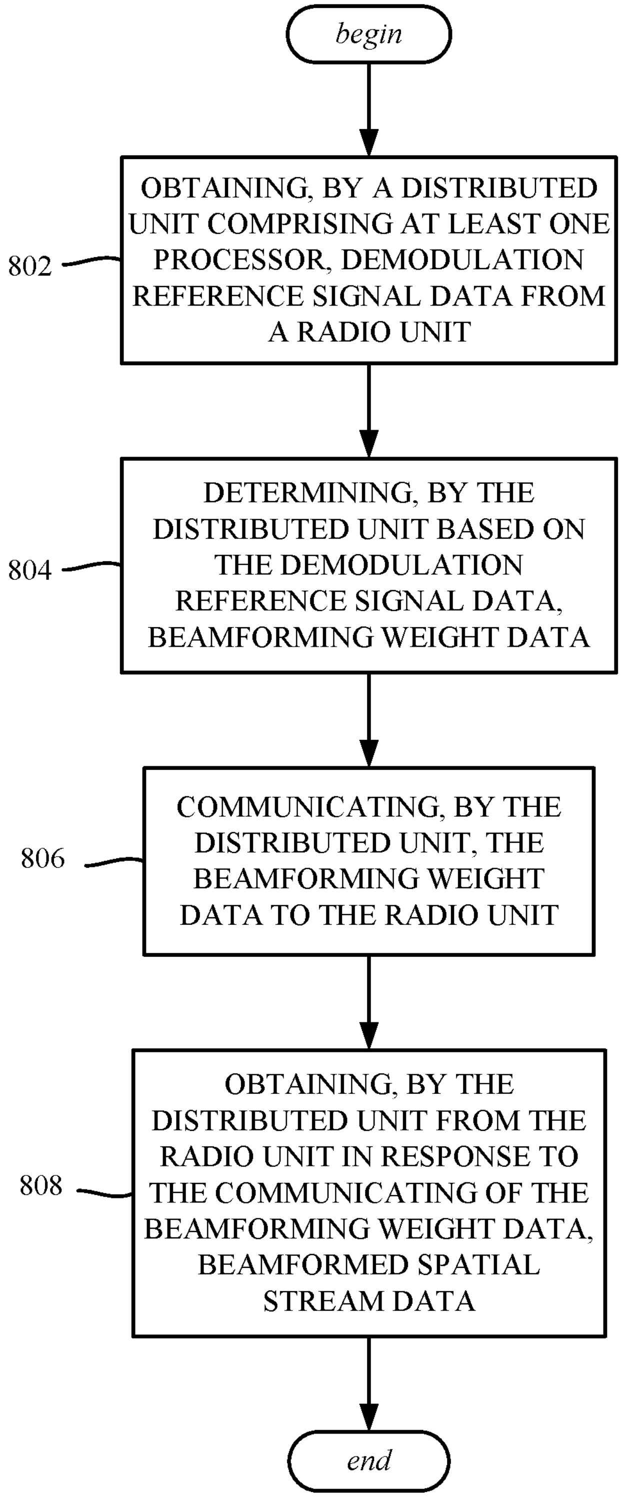
FIG. 8 is a flow diagram showing example operations related to obtaining beamformed spatial stream data at a disturbed unit based on demodulation reference signal data, in accordance with various example embodiments and implementations of the subject disclosure.

One or more example embodiments, such as corresponding to example operations of a method, are represented in FIG. 8. Example operation 802 represents obtaining, by a distributed unit comprising at least one processor, demodulation reference signal data from a radio unit. Example operation 804 represents determining, by the distributed unit based on the demodulation reference signal data, beamforming weight data. Example operation 806 represents communicating, by the distributed unit, the beamforming weight data to the radio unit. Example operation 808 represents obtaining, by the distributed unit from the radio unit in response to the communicating of the beamforming weight data, beamformed spatial stream data.

Communicating the beamforming weight data to the radio unit can include communicating beamforming coefficients to the radio unit.

Communicating the beamforming weight data to the radio unit can be for a current slot, and the beamformed spatial stream data can correspond to the current slot.

Communicating the beamforming weight data to the radio unit can be for a future slot, and the beamformed spatial stream data can correspond to the future slot.

Further operations can include obtaining, by the distributed unit from the radio unit, sounding reference signal data, and communicating, by the distributed unit to the radio unit based on the sounding reference signal data, at least one of: channel information, sounding reference signal data-based beamforming weight data, demodulation reference signal data combined with sounding reference signal data-based beamforming weight data, or predicted beamforming weight data.

Further operations can include communicating, by the distributed unit to the radio unit, message data that indicates which demodulation reference signal data is to be communicated as non-beamformed demodulation reference signal data.

The beamformed spatial stream data can include a group of beamformed spatial stream data candidates, and further operations can include combining, by the distributed unit, the spatial stream data candidates into the spatial stream data to determine a spatial stream that is more optimal relative to the spatial stream data candidates according to a defined criterion.

Figure 9:
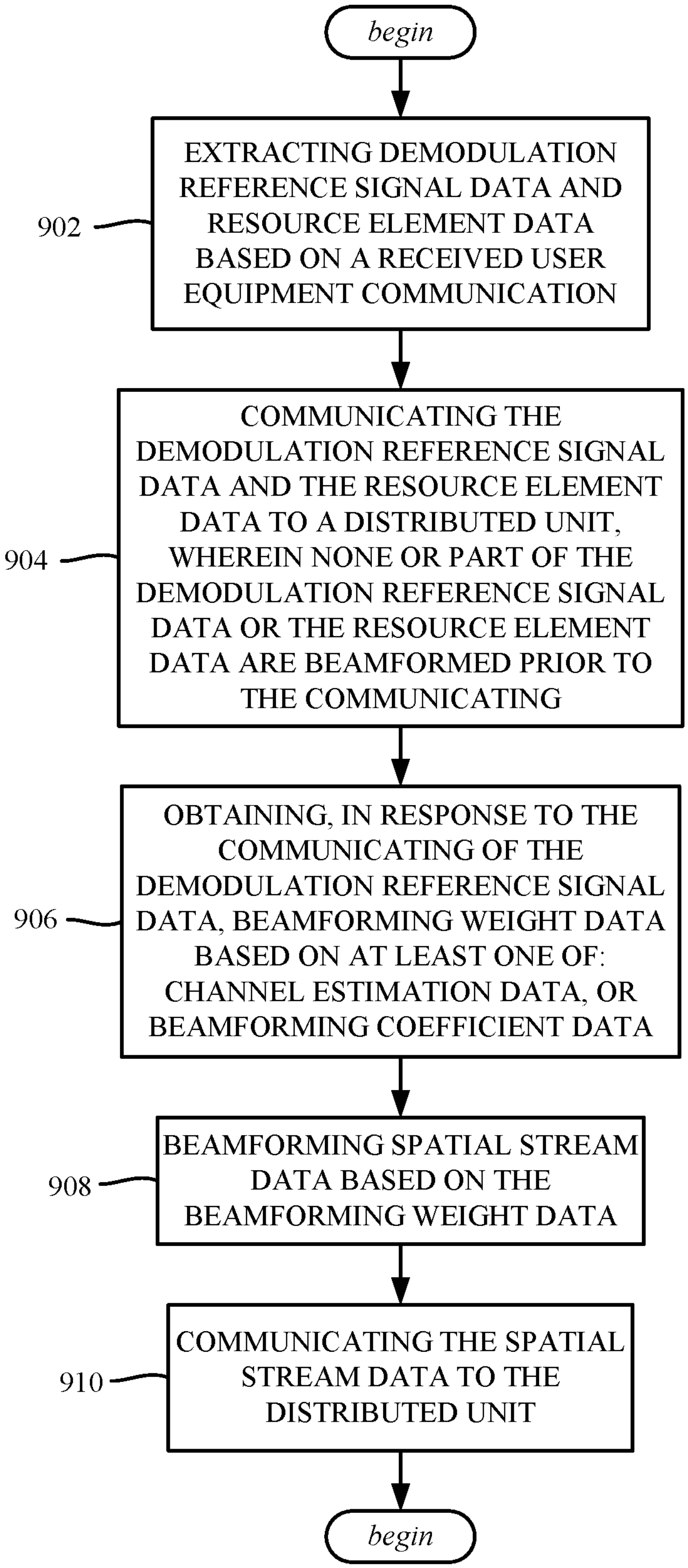
FIG. 9 is a flow diagram showing example operations related to communicating spatial stream data based on demodulation reference signal data to a distributed unit, in accordance with various example embodiments and implementations of the subject disclosure.

FIG. 9 summarizes various example operations, e.g., corresponding to a machine-readable medium, comprising executable instructions that, when executed by a processor of network equipment, facilitate performance of operations. Example operation 902 represents extracting demodulation reference signal data and resource element data based on a received user equipment communication. Example operation 904 represents communicating the demodulation reference signal data and the resource element data to a distributed unit, wherein none or part of the demodulation reference signal data or the resource element data are beamformed prior to the communicating. Example operation 906 represents obtaining, in response to the communicating of the demodulation reference signal data, beamforming weight data based on at least one of: channel estimation data, or beamforming coefficient data. Example operation 908 represents beamforming spatial stream data based on the beamforming weight data. Example operation 910 represents communicating the spatial stream data to the distributed unit.

The beamforming of the spatial stream data can include beamforming a group of spatial stream data candidates for the communicating of the spatial stream data to the distributed unit.

Obtaining the beamforming weight data can be for a future slot, and beamforming the spatial stream data can include beamforming the spatial stream data in response to receiving a user equipment communication in the future slot.

As can be seen, the technology described herein facilitates demodulation reference signal-based receive beamforming in a split between a radio unit and a distributed unit. The heavy computational resources needed for channel estimation, DMRS weight calculation and equalization are located in the distributed unit, whereby the radio unit only needs limited computational resources.

Figure 10:
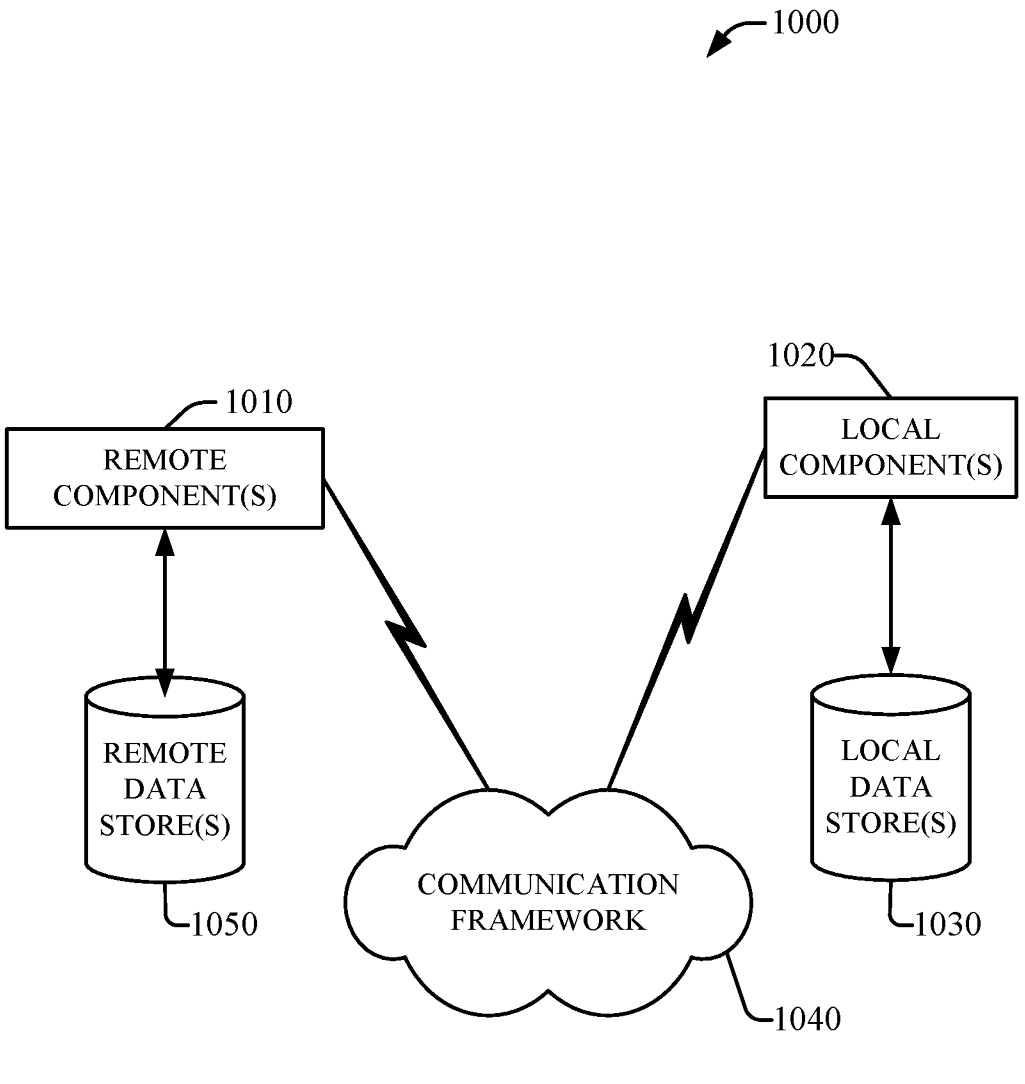
FIG. 10 is a block diagram representing an example computing environment into which example embodiments of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
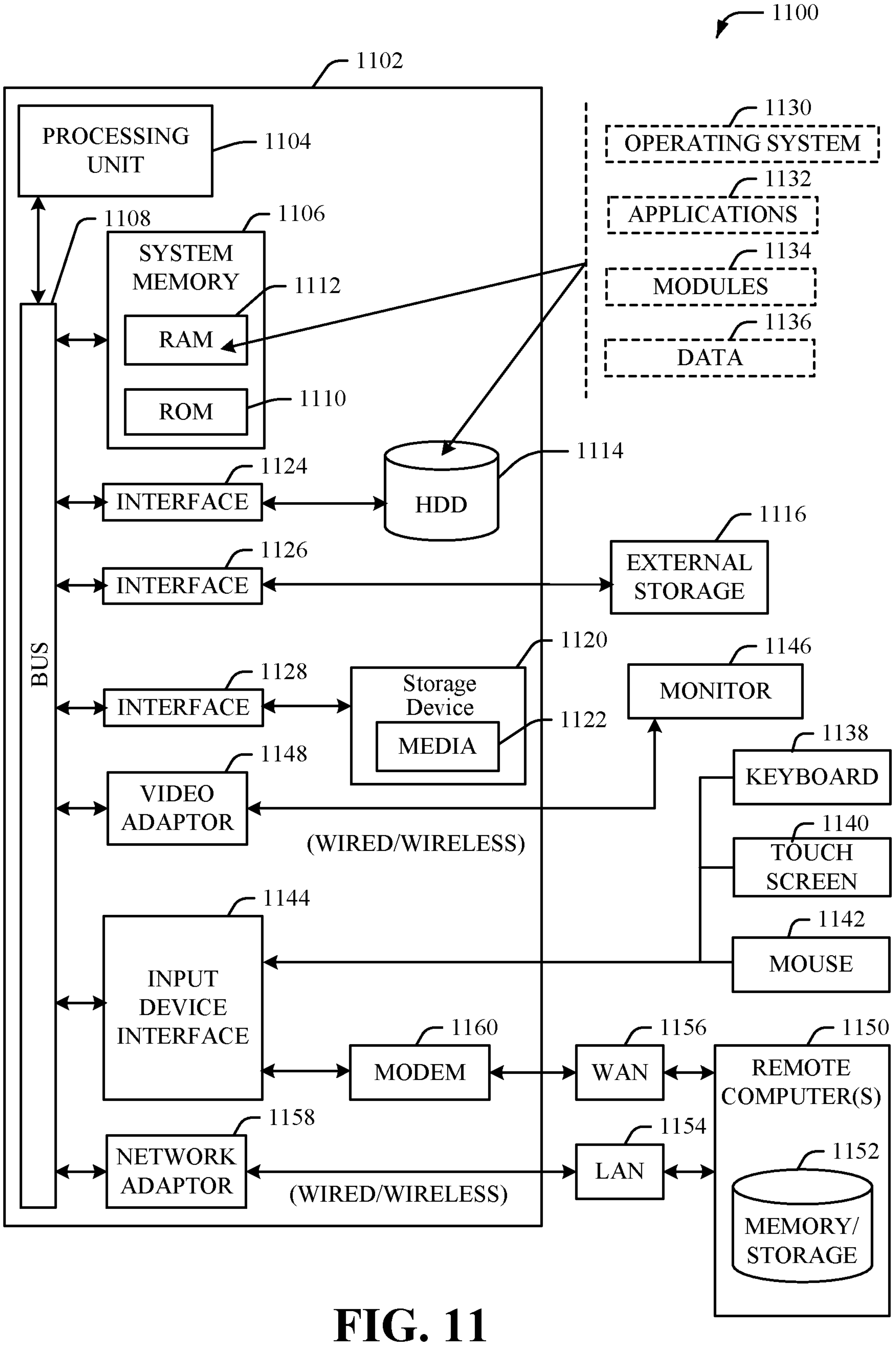
FIG. 11 depicts an example schematic block diagram of a computing environment with which the disclosed subject matter can interact/be implemented at least in part, in accordance with various example embodiments and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the example embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms “component,” “system,” “platform,” “layer,” “selector,” “interface,” and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

at least one processor; and at least one memory that stores executable instructions that, when executed by the at least one processor, facilitate performance of operations, the operations comprising:

obtaining received symbol data based on a communication with a user equipment;

extracting demodulation reference signal data representative of a demodulation reference signal from the received symbol data;

communicating the demodulation reference signal data to a distributed unit;

obtaining, in response to the communicating of the demodulation reference signal data, beamforming weight data representative of beamforming coefficients;

determining, based on the beamforming weight data, receive beamform data from the received symbol data;

communicating the receive beamform data to the distributed unit; and obtaining message data from the distributed unit that indicates which demodulation reference signal data is to be communicated as non-beamformed demodulation reference signal data, wherein the communicating of the demodulation reference signal data comprises communicating at least some of the demodulation reference signal data to the distributed unit as beamformed demodulation reference signal data, and communicating at least some of the demodulation reference signal data to the distributed unit as the non-beamformed demodulation reference signal data.

2. The network equipment of claim 1, wherein the beamforming weight data is for a current slot, and wherein the determining of the receive beamform data comprises beamforming the received symbol data based on the beamforming weight data for the communication with the user equipment.

3. The network equipment of claim 1, wherein the received symbol data comprises first received symbol data based on a first communication with the user equipment, wherein the beamforming weight data is for a future slot, wherein the operations further comprise obtaining second received symbol data based on a second communication with the user equipment, and beamforming the second received symbol data based on the beamforming weight data, and wherein the communicating of the receive beamform data to the distributed unit comprises communicating the second receive beamform data to the distributed unit.

4. The network equipment of claim 1, wherein the obtaining of the received symbol data is performed by a radio unit of the network equipment, and wherein the radio unit applies at least a fast Fourier transform function that outputs the received symbol data for the extracting of the demodulation reference signal data, and for the determining of the receive beamform data.

5. The network equipment of claim 1, wherein the beamforming weight data comprises first beamforming weight data, and wherein the operations further comprise extracting sounding refence signal data from the received symbol data, communicating the sounding refence signal data to the distributed unit, obtaining, in response to the communicating of the sounding refence signal data, second beamforming weight data based on the sounding refence signal data, and using the first beamforming weight data in conjunction with the second beamforming weight data as the beamforming weight data for the second communication with the user equipment.

6. The network equipment of claim 5, wherein the second beamforming weight data is determined by the distributed unit.

7. The network equipment of claim 5, wherein the obtaining of the second beamforming weight data comprises obtaining channel information from the distributed unit, and processing the channel information into the second beamforming weight data.

8. The network equipment of claim 1, wherein the communicating of the receive beamform data to the distributed unit comprises sending one or more spatial streams as beam candidate data to the distributed unit.

9. The network equipment of claim 1, wherein the beamforming weight data comprises predicted beamforming weight data for the second communication with the user equipment.

10. A method, comprising:

obtaining, by a distributed unit comprising at least one processor, demodulation reference signal data from a radio unit;

determining, by the distributed unit based on the demodulation reference signal data, beamforming weight data;

communicating, by the distributed unit, the beamforming weight data to the radio unit;

obtaining, by the distributed unit from the radio unit in response to the communicating of the beamforming weight data, beamformed spatial stream data; and prior to obtaining the demodulation reference signal data from the radio unit, communicating, by the distributed unit, to the radio unit, message data that indicates which demodulation reference signal data is to be communicated as non-beamformed demodulation reference signal data.

11. The method of claim 10, wherein the communicating of the beamforming weight data to the radio unit comprises communicating beamforming coefficients to the radio unit.

12. The method of claim 10, wherein the communicating of the beamforming weight data to the radio unit is for a current slot, and wherein the beamformed spatial stream data corresponds to the current slot.

13. The method of claim 10, wherein the communicating of the beamforming weight data to the radio unit is for a future slot, and wherein the beamformed spatial stream data corresponds to the future slot.

14. The method of claim 10, further comprising obtaining, by the distributed unit from the radio unit, sounding reference signal data, and communicating, by the distributed unit to the radio unit based on the sounding reference signal data, at least one of: channel information, sounding reference signal data-based beamforming weight data, demodulation reference signal data combined with sounding reference signal data-based beamforming weight data, or predicted beamforming weight data.

15. The method of claim 10, wherein the beamformed spatial stream data comprises a group of beamformed spatial stream data candidates, and further comprising combining, by the distributed unit, the spatial stream data candidates into the spatial stream data to determine a spatial stream that is more optimal relative to the spatial stream data candidates according to a defined criterion.

16. A non-transitory machine-readable medium, comprising executable instructions that, when executed by at least one processor of network equipment, facilitate performance of operations, the operations comprising:

extracting demodulation reference signal data and resource element data based on a received user equipment communication;

obtaining message data from a distributed unit that indicates which demodulation reference signal data is to be communicated as non-beamformed demodulation reference signal data, communicating the demodulation reference signal data and the resource element data to the distributed unit, wherein none or only part of the demodulation reference signal data or the resource element data are beamformed prior to the communicating;

obtaining, in response to the communicating of the demodulation reference signal data, beamforming weight data based on at least one of: channel estimation data, or beamforming coefficient data;

beamforming spatial stream data based on the beamforming weight data; and communicating the spatial stream data to the distributed unit.

17. The non-transitory machine-readable medium of claim 16, wherein the beamforming of the spatial stream data comprises beamforming a group of spatial stream data candidates for the communicating of the spatial stream data to the distributed unit.

18. The non-transitory machine-readable medium of claim 16, wherein the obtaining of the beamforming weight data is for a future slot, and wherein the beamforming of the spatial stream data comprises beamforming the spatial stream data in response to receiving a user equipment communication in the future slot.

19. The non-transitory machine-readable medium of claim 16, wherein the communicating of the demodulation reference signal data comprises communicating less than all of the demodulation reference signal data to the distributed unit as beamformed demodulation reference signal data, and communicating at least some of the demodulation reference signal data to the distributed unit as the non-beamformed demodulation reference signal data.

20. The non-transitory machine-readable medium of claim 16, wherein a radio unit of the network equipment comprises the at least one processor.

* * * * *